United States Patent
Lohmueller

(10) Patent No.: US 8,459,042 B2
(45) Date of Patent: Jun. 11, 2013

(54) GAS TURBINE ENGINE COMBUSTOR AND METHOD FOR DELIVERING PURGE GAS INTO A COMBUSTION CHAMBER OF THE COMBUSTOR

(75) Inventor: Steven Joseph Lohmueller, Reading, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/353,414

(22) Filed: Jan. 19, 2012

(65) Prior Publication Data

US 2012/0114478 A1   May 10, 2012

Related U.S. Application Data

(62) Division of application No. 11/965,397, filed on Dec. 27, 2007, now Pat. No. 8,205,457.

(51) Int. Cl.
*F02C 7/20* (2006.01)
(52) U.S. Cl.
USPC .................................. 60/800; 60/796; 60/754
(58) Field of Classification Search
USPC ............... 60/796–797, 799–800, 737, 740, 60/746–748, 752, 754–760, 39.821
See application file for complete search history.

(56) References Cited

U.S. PATENT DOCUMENTS

| | | | |
|---|---|---|---|
| 4,322,945 A | 4/1982 | Peterson et al. | |
| 6,145,294 A | 11/2000 | Traver et al. | |
| 6,405,524 B1 | 6/2002 | Mistry et al. | |
| 6,725,667 B2 | 4/2004 | Farmer et al. | |
| 6,871,501 B2 | 3/2005 | Bibler et al. | |
| 6,976,363 B2 | 12/2005 | McMasters et al. | |
| 7,086,232 B2 | 8/2006 | Moertle et al. | |
| 7,093,439 B2 | 8/2006 | Pacheco-Tougas et al. | |
| 7,121,095 B2 | 10/2006 | McMasters et al. | |
| 7,775,051 B2 | 8/2010 | Hernandez et al. | |
| 2003/0046934 A1 | 3/2003 | Sherwood | |
| 2007/0119183 A1 | 5/2007 | Evulet | |
| 2007/0199329 A1* | 8/2007 | Hernandez et al. | 60/746 |
| 2007/0234727 A1 | 10/2007 | Patel et al. | |

FOREIGN PATENT DOCUMENTS

| | | |
|---|---|---|
| JP | 56-168039 A | 12/1981 |
| JP | 2005-061822 A | 3/2005 |
| JP | 2007-232359 A | 9/2007 |

OTHER PUBLICATIONS

JP Office Action dated Aug. 7, 2012 from corresponding JP Application No. 2008-274055.

* cited by examiner

*Primary Examiner* — Andrew Nguyen
(74) *Attorney, Agent, or Firm* — General Electric Company; David J. Clement; John S. Beulick

(57) ABSTRACT

In a gas turbine engine combustor and method for delivering purge gas thereto, a ferrule is generally coupled to the housing and moveable relative thereto. The ferrule has a primary opening through which a combustor component extends into a combustion chamber of the combustor. The ferrule further has a plurality of purge gas openings separate from and in transversely spaced relationship with the primary opening to allow purge gas to flow through the ferrule. In a first position of the ferrule at least one purge gas opening is blocked against the flow of purge gas therethrough and at least one other purge gas opening is unblocked against purge gas flow. In a second position of the ferrule at least one of the blocked purge gas openings of the first ferrule position is unblocked to permit the flow of purge gas therethrough.

5 Claims, 5 Drawing Sheets

GAS TURBINE ENGINE COMBUSTOR AND METHOD FOR DELIVERING PURGE GAS INTO A COMBUSTION CHAMBER OF THE COMBUSTOR

CROSS REFERENCE TO RELATED APPLICATIONS

This application is a divisional application of and claims priority to U.S. patent application Ser. No. 11/965,397 filed Dec. 27, 2007 now U.S. Pat. No. 8,205,457 for "GAS TURBINE ENGINE COMBUSTOR AND METHOD FOR DELIVERING PURGE GAS INTO A COMBUSTION CHAMBER OF THE COMBUSTOR," which is hereby incorporated by reference herein in its entirety.

BACKGROUND

The field of this invention relates generally to gas turbine engine combustors, and more particularly to ferrules for mounting engine components in communication with the combustion chamber of such combustors.

Gas turbine engines such as those used as aircraft engines typically have a combustor defining an internal combustion chamber in which fuel is combusted. One or more components, including without limitation fuel nozzles and igniters, are held in communication with the internal combustion chamber by being mounted on the combustor housing by a suitable ferrule and extending through the housing into the combustion chamber. Conventional ferrules (and therefore the components mounted on the combustor by such ferrules) are commonly moveable relative to the housing to allow for tolerance stackup and thermal growth of various operating components of the engine.

An annular space or cavity within the internal combustion chamber surrounds the portion of the component that extends through the ferrule into the chamber. Due to aerodynamics within the combustion chamber, fuel can enter into this annular cavity and burn, thereby increasing the temperature of the component and increasing the risk of damage to the component and/or to the combustor housing. To this end, it is known to provide a ring of uniformly spaced and sized openings (typically referred to as purge gas openings or cooling air openings) in the ferrule at a transverse location relative to the portion of the engine component that extends into the chamber such that purge gas (usually air) flows into the combustion chamber via the purge gas openings at the annular cavity surrounding the component to purge the cavity of trapped fuel and/or to cool the component within the combustion chamber.

As the combustion chamber heats up, tolerance stackup and relative thermal growth of the various components of the combustor cause the ferrule and the component mounted thereby to move or become repositioned transversely relative to the combustor housing. Such movement results in the annular cavity surrounding the portion of the ferrule mounted component within the combustion chamber to substantially narrow along a region of the annular cavity and to substantially widen along an opposite region of the annular cavity. Along the widened region of the cavity the single ring of purge gas openings is no longer sufficient to direct enough air into the cavity to purge the cavity of trapped fuel.

There is a need, therefore, for a gas turbine engine combustor having one or more ferrules that more effectively allow for purging of trapped fuel surrounding components that are mounted by the ferrule and extend into the combustion chamber of an engine throughout the range of movement of the ferrule during operation of the engine.

SUMMARY

In one aspect, a combustor for a gas turbine engine generally comprises a housing at least in part defining an internal combustion chamber of the combustor, a combustor component held in communication with the combustion chamber, and a ferrule generally coupled to the housing and being moveable relative thereto between a first position and a second position. The ferrule has a primary opening through which the combustor component extends for support of the combustor component by the ferrule such that the combustor component is moveable conjointly with the ferrule relative to the housing. The ferrule further has a plurality of purge gas openings formed therein separate from and in transversely spaced relationship with the primary opening to allow purge gas to flow through the ferrule into the combustion chamber. The purge gas openings are located in the ferrule such that in the first position of the ferrule the purge gas openings comprise at least one blocked purge gas opening that is blocked against the flow of purge gas therethrough into the combustion chamber and at least one unblocked purge gas opening through which purge gas is permitted to flow into the combustion chamber. And in the second position of the ferrule at least one of the blocked purge gas openings of the first ferrule position is unblocked to permit the flow of purge gas therethrough into the combustion chamber.

A ferrule assembly according to one aspect thereof for mounting a combustor component on a combustor housing of a gas turbine engine generally comprises a ferrule mount secured to the housing to remain generally stationery relative thereto during operation of the gas turbine engine. A ferrule is mounted on the ferrule mount for transverse sliding movement relative thereto between a first transverse ferrule position and a second transverse ferrule position. The ferrule has a primary opening for receiving the combustor component therethrough for conjoint transverse movement with the ferrule relative to the ferrule mount. The ferrule further has a plurality of purge gas openings formed therein separate from and in transversely spaced relationship with the primary opening to allow purge gas to flow through the ferrule into the combustion chamber. The purge gas openings are located in the ferrule such that in the first position of the ferrule the purge gas openings comprise at least one blocked purge gas opening that is blocked by the ferrule mount against the flow of purge gas therethrough into the combustion chamber and at least one purge gas opening unblocked by the ferrule mount and through which purge gas is permitted to flow into the combustion chamber. And in the second position of the ferrule at least one of the blocked purge gas openings of the first ferrule position is unblocked by the ferrule mount to permit the flow of purge gas therethrough into the combustion chamber.

In aspect of a method for directing purge gas into a combustion chamber of a gas turbine engine combustor, a flow of purge gas is directed to a ferrule of the combustor. At least one of the purge gas openings is blocked in a first position of the ferrule to inhibit the flow of purge gas therethrough while a plurality of other purge gas openings remains unblocked to permit the flow of purge gas therethrough into the combustion chamber. At least one blocked purge gas opening is subsequently unblocked upon movement of the ferrule to a second position thereof.

BRIEF DESCRIPTION OF THE DRAWINGS

Corresponding reference characters indicate corresponding parts throughout the drawings.

DETAILED DESCRIPTION

Figure 1:
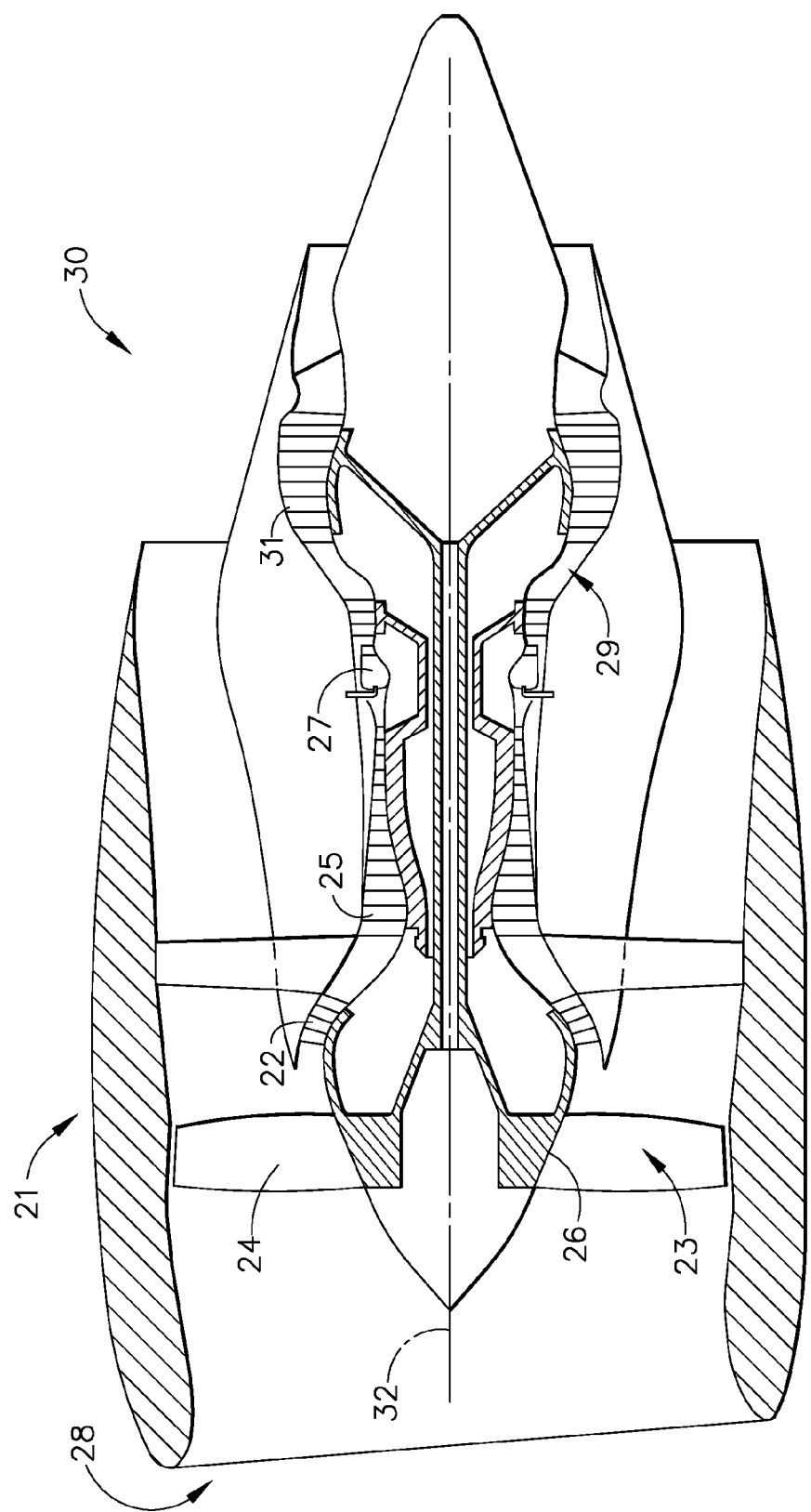
FIG. 1 is a schematic of one embodiment of a gas turbine engine including a combustor having an internal combustion chamber.

Referring now to the drawings and in particular to FIG. 1, one embodiment of a gas turbine engine is illustrated schematically and indicated generally at 21. Gas turbine engine 21 comprises a fan assembly (indicated generally at 23), a high pressure compressor 25, a combustor 27, a high pressure turbine (indicated generally at 29), a low pressure turbine 31, and a booster 22. Fan assembly 23 includes an array of fan blades 24 extending radially outward from a rotor disc 26. Engine 21 also has an intake side indicated generally at 28, an exhaust side indicated generally at 30, and longitudinal, or rotation axis 32. As an example, in one embodiment the gas turbine engine 21 may comprise a GE1800 engine having what is commonly referred to as a trapped vortex combustor and being commercially available from General Electric Company, Cincinnati, Ohio. It is understood, however, that the gas turbine engine 21 may be other than that referenced above without departing from the scope of this invention.

In operation, air flows along an engine rotation axis 32 through fan assembly 23 and compressed air is supplied to the high pressure compressor 25. The highly compressed air is delivered to combustor 27. Air from combustor 27 drives turbines 29, 31 which in turn drive fan assembly 23.

Figure 2A:
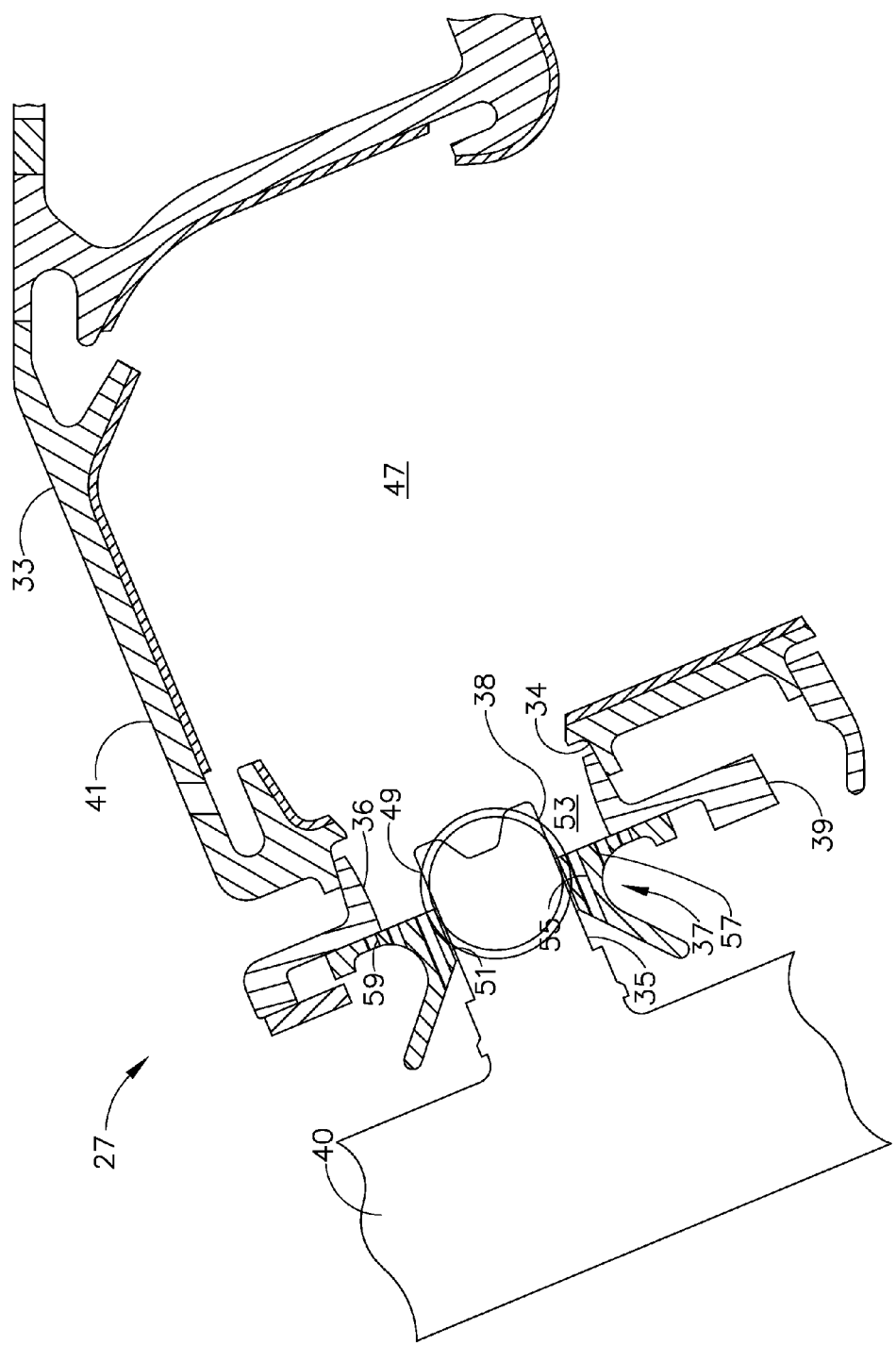
FIG. 2a is a cross-section of a portion of the combustor including a combustor housing which defines the internal combustion chamber of the combustor, a ferrule and a fuel conduit mounted by the ferrule on the combustor housing for transverse movement of the ferrule and fuel conduit relative to the housing, with the ferrule and fuel conduit illustrated in a first, generally centered position relative to the housing.

FIG. 2a is a cross-section of a portion of combustor 27 including one embodiment of a ferrule, generally indicated at 37. In general, combustor 27 comprises a housing 33 configured to define an internal combustion chamber 47 in which the combustion of fuel occurs during operation of the engine 21. Combustor housing 33 as that term is used herein refers to one or more structural components of combustor 27 configured to singly or collectively define internal combustion chamber 47. For example, in the illustrated embodiment of FIG. 2a combustor housing 33 comprises an annular outer liner 41, an annular inner liner (not shown) and a domed end (not shown) together at least in part defining combustion chamber 47 having a generally annular shape.

Figure 3:
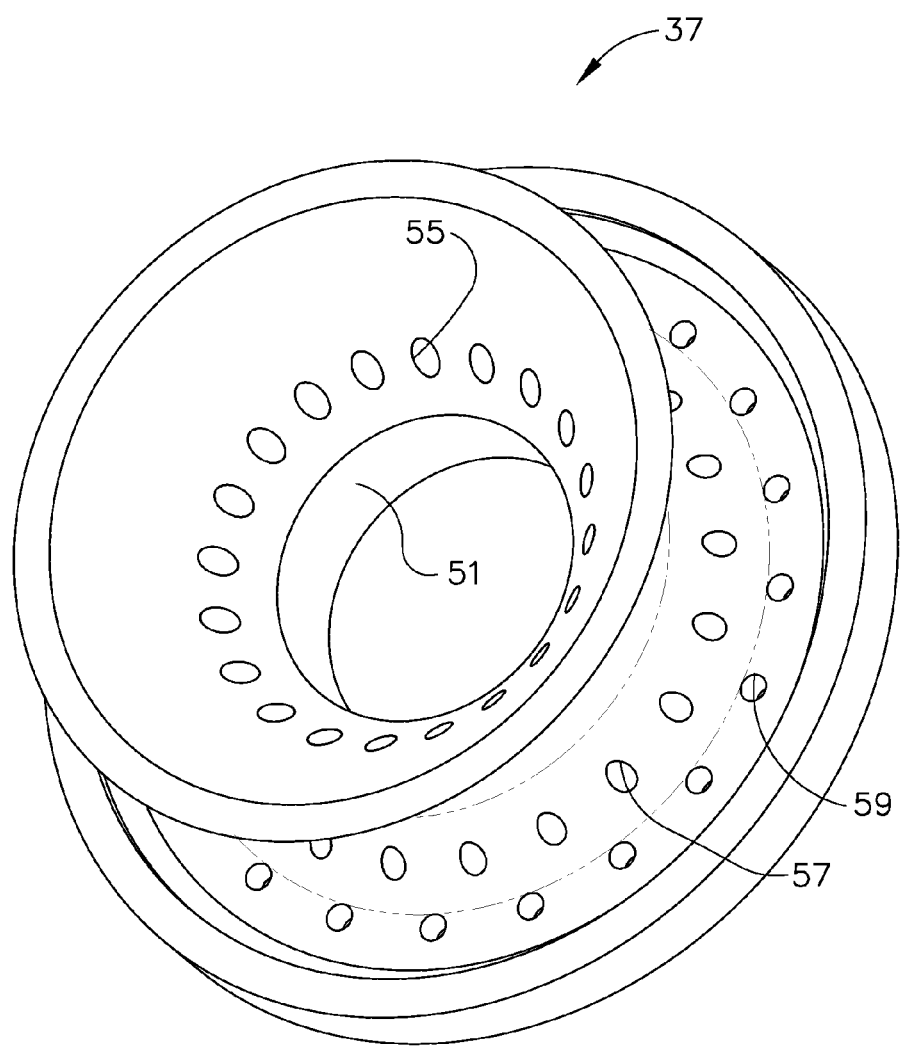
FIG. 3 is a perspective of the ferrule illustrating a plurality of purge gas openings extending longitudinally through the ferrule.

Housing 33 further comprises a suitable ferrule mount 39 (also commonly referred to as a ferrule tower) disposed at an opening 34 in combustor housing 33. Ferrule mount 39 mounts ferrule 37 on combustor housing 33 generally at opening 34 in housing 33. More suitably, ferrule 37 is mounted on combustor housing 33 for transverse movement of ferrule 37, and more particularly transverse sliding movement of ferrule 37, relative to ferrule mount 39 (and more broadly, relative to combustor housing 33). As illustrated in FIGS. 2a and 3, ferrule 37 has a central or primary opening 51 extending longitudinally therethrough for mounting a combustor component such as a fuel conduit 35 that extends through housing opening 34 (which in the illustrated embodiment is further defined by a central opening 36 in ferrule mount 39) and has a terminal end portion 38 that projects into combustion chamber 47.

For purposes of further describing the present embodiment, combustor component 35 is illustrated in the drawings and described herein as being a fuel conduit (and more particularly a fuel nozzle) which is in flow communication with a fuel source (not shown) and suitable delivery line 40 and extends through primary opening 51 of ferrule 37 to mount fuel conduit 35 on combustor housing 33. It is understood, however, that ferrule 37 may be used to mount other combustor components on combustor housing 33 to extend through combustor housing 33 into combustion chamber 47 without departing from the scope of this invention. For example, in other embodiments ferrule 37 may mount a fuel igniter (not shown) through primary opening 51 of ferrule 37 for extension through combustor housing 33 into combustion chamber 47. It is contemplated that a plurality of ferrules similar to ferrule 37 may be used to mount multiple combustor components, such as multiple fuel conduits 35 and/or multiple igniters on the combustor housing 33.

With continued reference to FIGS. 2a and 3, the illustrated ferrule 37 is generally annular in cross-section to define central or primary opening 51. Mounting fuel conduit 35 on ferrule 37 within primary opening 51 allows for conjoint transverse sliding movement of fuel conduit 35 with ferrule 37 relative to combustor housing 33. This transverse movement accommodates tolerance stackup and thermal growth caused by temperature changes of and temperature differentials between various components of gas turbine engine 21. For example, because engine operating conditions can vary considerably from start-up to long duration operation, various components of engine 21 heat-up at different rates and the tolerance stackup and thermal growth that occur can vary among parts and/or throughout the duration of operation. As such, the transverse position of ferrule 37 (and hence fuel conduit 35) relative to combustor housing 33, and more particularly relative to ferrule mount 39 can vary from use to use an/or during operation of engine 21.

With particular reference to FIG. 2a, ferrule 37 (and hence fuel conduit 35) is nominally positioned in a generally centered position (broadly, a first position) relative to ferrule mount 39 in which primary opening 51 of ferrule 37 (and fuel conduit 35 extending therethrough) is concentric with opening 34 in combustor housing 33, and more particularly with central opening 36 of ferrule mount 39. It is understood, however, that ferrule 37 may be nominally positioned relative to ferrule mount 39 such that ferrule primary opening 51 is other than concentric with ferrule mount opening 36 without departing from the scope of this invention.

Figure 2B:
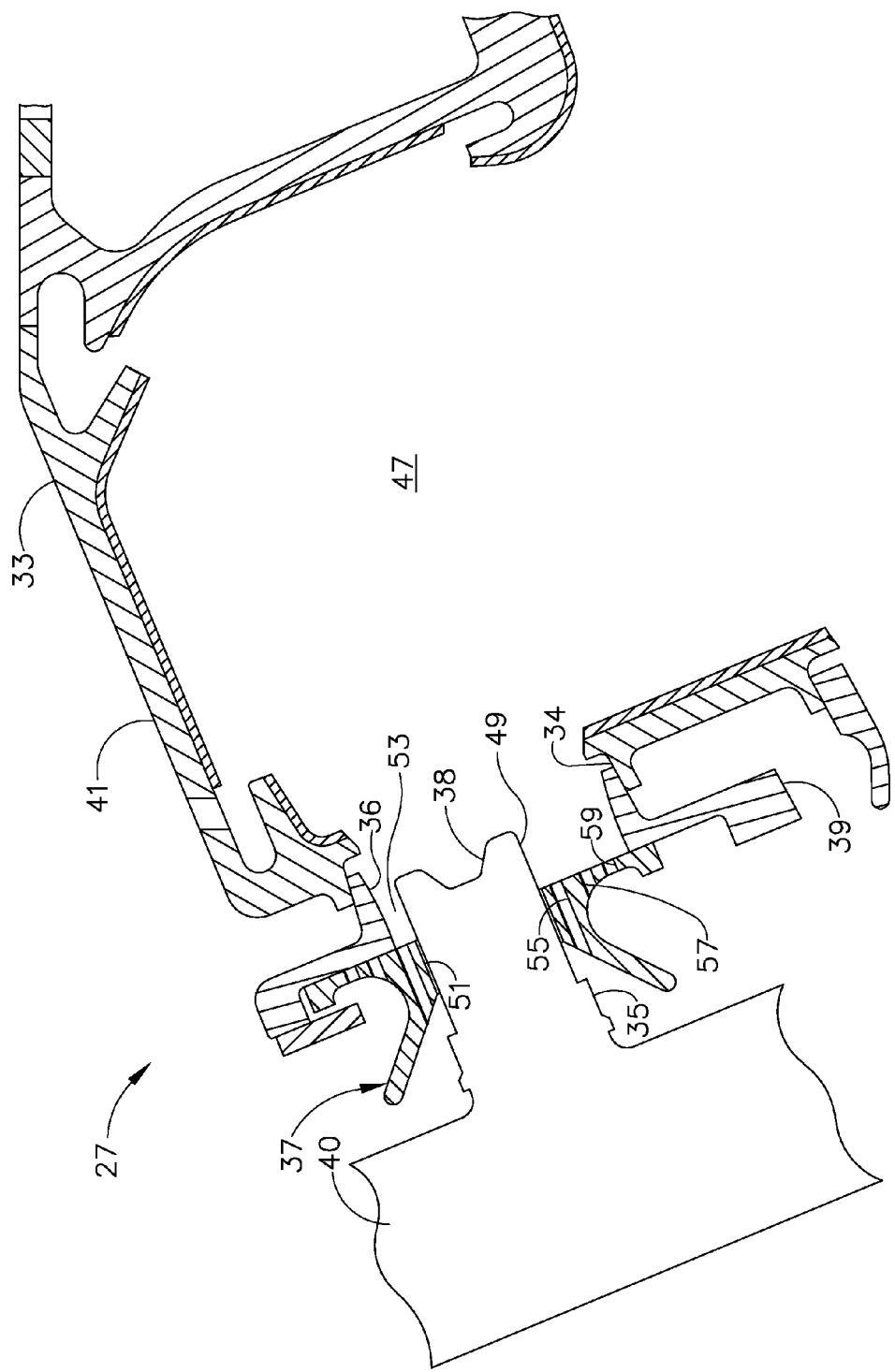
FIG. 2b is a cross-section similar to FIG. 2a with the ferrule and fuel conduit illustrated in a second, generally maximum transverse offset position relative to the housing.

Ferrule 37 is suitably mounted on ferrule mount 39 for transverse sliding movement relative thereto from the nominal or centered (e.g., first) position to a maximum transverse position as illustrated in FIG. 2b at which ferrule mount 39 or other suitable stop structure limits further transverse movement of ferrule 37. Ferrule mount 39 or other stop structure in one particularly suitable embodiment is configured to permit equal maximum transverse movement of ferrule 37 in any direction relative to its centered position. It is contemplated, however, that ferrule mount 39 or other stop structure may instead be configured such that the maximum transverse position of ferrule 37 upon movement in one direction is different from the maximum transverse position of ferrule 37 upon movement in another direction.

For description purposes, the maximum transverse position of ferrule 37 as illustrated in FIG. 2b is broadly referred to herein as a second position of ferrule 37 that is different from, i.e., transversely offset or spaced from, the first position of ferrule 37. It is understood, however, that ferrule 37 is moveable transversely relative to ferrule mount 39 to substantially any second position along a maximum range of transverse movement of ferrule 37 between the first, centered position of ferrule 37 and the maximum transverse position thereof.

Referring again to FIG. 2a, end portion 38 of fuel conduit 35 extending into combustion chamber 47 has an outer surface 49 that together with combustor housing 33 (and more particularly with ferrule mount 39 in the illustrated embodiment) defines an annular gap or cavity 53 surrounding fuel conduit 35 within combustion chamber 47. Upon transverse sliding movement of ferrule 37 relative to ferrule mount 39, cavity 53 substantially narrows in the direction of movement of ferrule 37 as illustrated in FIG. 2b while cavity 53 substantially widens in the direction opposite the direction of movement of ferrule 37.

A plurality of purge gas openings 55, 57, 59 are formed in ferrule 37 and extend longitudinally therethrough as illustrated in FIGS. 2a and 3. The purge gas openings 55, 57, 59 communicate at an outer end (relative to combustion chamber 47) of ferrule 37 with a source (not shown) of purge gas, such as pressurized air flowing through the engine, to direct gas flow through openings 55, 57, 59 toward an inlet end of ferrule 37 facing in toward combustion chamber 47. In one particularly suitable embodiment, as illustrated in FIGS. 2a and 3, a first set of purge openings 55 is formed in ferrule 37 in a generally ring-like pattern about primary opening 51 of ferrule 37.

Purge gas openings 55 are uniformly spaced from each other and are transversely spaced from primary opening 51 of ferrule 37 (and hence the portion of fuel conduit 51 extending into combustion chamber 47) a uniform distance. More suitably, purge gas openings 55 are transversely spaced from primary opening 51 of ferrule 37 a distance less than the maximum range of transverse movement of ferrule 37 relative to ferrule mount 39 (i.e., relative to combustor housing 33) so that purge gas openings 55 open into combustion chamber 47 and more particularly the annular cavity 53 regardless of the transverse position of ferrule 37 as illustrated in FIG. 2b. That is, this first set of purge gas openings 53 remains unblocked by ferrule mount 39 upon movement of ferrule 37 through its full range of transverse movement relative to ferrule mount 39.

A second set of purge gas openings 57 also form a ring-like pattern about primary opening 51 of the ferrule (and hence fuel conduit 35) with the ring-like pattern generally concentric with and spaced transversely outward from the ring-like pattern formed by first set of purge gas openings 55. As illustrated best in FIG. 4a, purge gas openings 57 are uniformly spaced from each other and spaced transversely a uniform distance from primary opening 51 of ferrule 37 in which this distance is greater than the transverse distance of purge gas openings 55 from ferrule 37.

In one particularly suitable embodiment the transverse distance of second set of purge gas openings 57 from ferrule primary opening 51 is such that in the nominal or center position of ferrule 37 relative to ferrule mount 39 all purge gas openings 57 open into annular cavity 53 (i.e., are unblocked by ferrule mount 39). However, the spacing of purge gas openings 57 from ferrule primary opening 51 is also such that transverse movement of ferrule 37 results in some purge gas openings 57 becoming blocked by ferrule mount 39 to inhibit purge gas from passing through such blocked openings as illustrated in FIG. 2b and FIGS. 4b-4e.

A third set of purge gas openings 59 is formed in ferrule 37 to form a generally ring-like pattern concentric with the patterns formed by first set of purge gas openings 55 and second set of purge gas openings 57. Purge gas openings 59 are uniformly spaced from each other and are spaced a uniform transverse distance from ferrule primary opening 51 (and hence fuel conduit 35) greater than the transverse distance of purge gas openings 57 from primary ferrule opening 51.

In one particularly suitable embodiment the distance that third set of purge gas openings 59 is from ferrule primary opening 51 is such that in the nominal or centered position of ferrule 37 (FIGS. 2a and 4a) relative to ferrule mount 39 all purge gas openings 59 are blocked by ferrule mount 39 to inhibit purge gas from passing through such blocked openings. However, the spacing of purge gas openings 59 from ferrule primary opening 51 is also such that transverse movement of ferrule 37 results in some purge gas openings 59 becoming unblocked by ferrule mount 39 and open to annular cavity 53 as illustrated in FIGS. 2b and 4e.

Figure 4A:
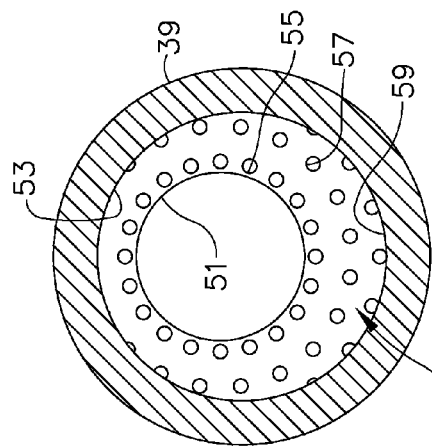
FIGS. 4a, 4b, 4c, 4d and 4e are schematic illustrations of the interior end of the ferrule with the ferrule at various transverse offset positions relative to the housing.
Figure 4B:
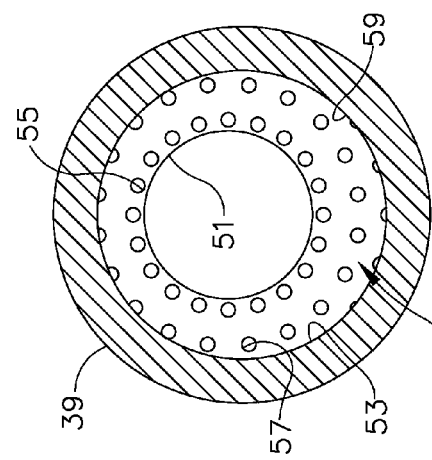
Figure 4C:
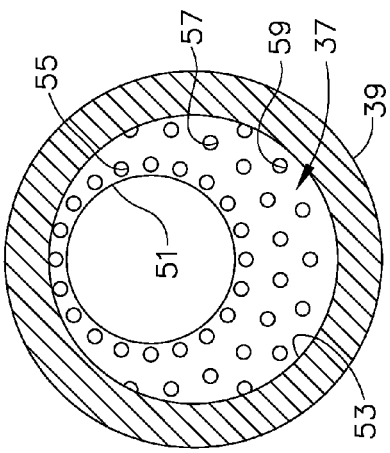
Figure 4D:
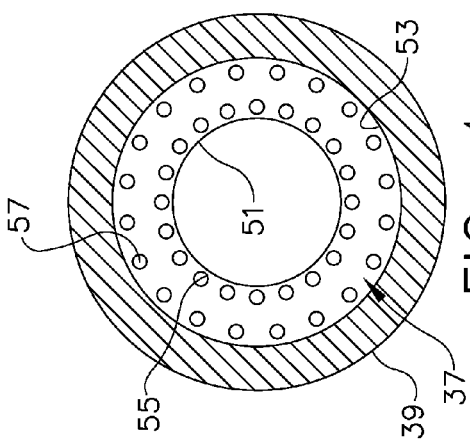
Figure 4E:
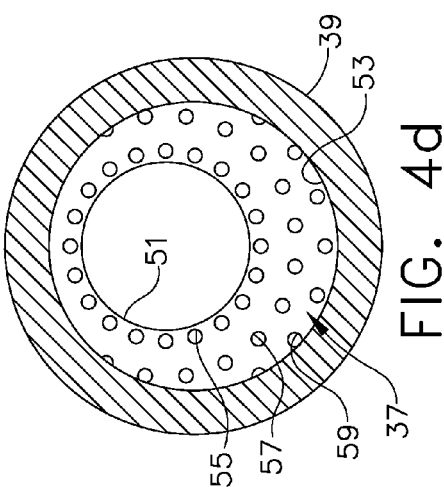

As best seen in FIG. 4e, purge gas openings 55 and 59 are generally in radial alignment with each other, i.e., a line drawn radially through ferrule 37 from the center of its primary opening 51 can pass through both purge gas openings 55 and purge gas openings 59. Purge gas openings 57 are circumferentially offset from purge gas openings 55, 59 so that purge gas openings 57 do not lie on such a radially drawn line. Thus, it is to be understood that in FIGS. 2a and 2b all three sets of purge gas openings 55, 57, 59 are illustrate for discussion purposes only in that where the first and third sets of purge gas openings 55, 59 are visible in a cross-section of ferrule 37, second set of purge gas openings 57 would otherwise not be visible. It is contemplated, however, that purge gas openings 57 may be located to lie on a common radially drawn line, or no purge gas openings 55, 57, 59 may lie on a common radially drawn line, without departing from the scope of this invention.

FIGS. 4a-4e illustrate operation of combustor 27, and more particularly ferrule 37 at various transverse positions of ferrule 37 relative to ferrule mount 39 (and more broadly, relative to combustor housing 33). In FIG. 4a, ferrule 37 and hence the fuel conduit 35 is in its nominal or central position relative to ferrule mount 39. In this position, both the first set of purge gas openings 55 and the second set of purge gas openings 57 are unblocked by ferrule mount 39 to permit the flow of purge gas therethrough into combustion chamber 47 at the annular cavity 53 surrounding fuel conduit 35. At least one purge gas opening 55, 57, 59 is blocked in this first, central position of ferrule 37. For example, in the illustrated embodiment the entire third (i.e., transversely outermost) set of purge gas openings 59 is blocked by ferrule mount 39 to inhibit purge gas flow through purge gas openings 59.

FIGS. 4b, 4c and 4d illustrate ferrule 37 at increasingly transverse offset positions of ferrule 37 (and hence fuel conduit 35) relative to ferrule mount 39. In particular, ferrule 37 has moved generally upward relative to ferrule mount 39. As a result, annular cavity 53 surrounding the portion of fuel conduit 35 that extends into combustion chamber 47 becomes narrower above fuel conduit 35 (i.e., in the upward direction of movement of ferrule 37) and becomes wider below fuel conduit 35 (i.e., opposite the upward direction of movement of ferrule 37). At the transverse position illustrated in FIG. 4b, some purge gas openings 57 become blocked by ferrule mount, thereby inhibiting purge gas flow through such openings 57. All (innermost) purge gas openings 55 remain unblocked.

At the increased transverse offset ferrule 37 position of FIG. 4c, additional purge gas openings 57 have become blocked by ferrule mount 39 above the primary opening 51 of ferrule 37 and fuel conduit 35. Because annular cavity 53 is substantially narrowed above fuel conduit 35, a reduced number of purge gas openings is needed to purge gas from this region of annular cavity 35. Below fuel conduit 35, annular cavity 53 substantially widens, thereby requiring an additional volume of purge gas to purge this larger volume region of annular cavity 53. Accordingly, some purge gas openings 59 of third set of purge gas openings 59 become unblocked by ferrule mount 39 in the widened region of annular cavity 53. FIG. 4d illustrates ferrule 37 in a greater transverse offset position than in FIG. 4c, with even more of the purge gas openings 57 becoming blocked above fuel conduit 35 while additional purge gas openings 59 become unblocked below fuel conduit 35 in accordance with the widening region of the annular cavity 53. Again, all (innermost) purge gas openings 55 remain unblocked.

FIG. 4e (as well as FIG. 2b) illustrates ferrule 37 in its maximum transverse offset position, i.e., as limited by ferrule mount 39 or other stop structure. Many purge gas openings 57 are blocked in this position while a substantial number of (outermost) purge gas openings 59 have become unblocked in accordance with the substantially widened region of annular cavity 53 below fuel conduit 35.

It will thus be seen that in any transverse position of ferrule 37 between its nominal or center position and its maximum transverse position at least one purge gas opening 55, 57, 59 is blocked against the flow of purge gas therethrough into combustion chamber 47 and at least one other purge gas opening 55, 57, 59 is unblocked to permit the flow of purge gas into combustion chamber 47. The first set of purge gas openings 55, however, remains entirely unblocked throughout the full range of transverse movement of ferrule 37.

The cross-sectional areas of purge gas openings 55, 57, 59 are generally equal in the illustrated embodiment. It is understood, however, that the purge gas openings 55, 57, 59 may be of different cross-sectional areas, such as the cross-section area of purge gas openings 55 being different from that of purge gas openings 57 and/or purge gas openings 59.

In one particularly suitable embodiment, the cross-sectional areas of purge gas openings 55, 57, 59, the number of purge gas openings 55, 57, 59, and transverse distance from primary opening 51 of ferrule 37 cooperate together such that a total purge gas flow-through area of ferrule 37 varies by less than or equal to about 15 percent throughout the entire range of transverse movement of ferrule 37 relative to ferrule mount 39, more suitably less than or equal to about 10 percent, and even more suitably less than or equal to about 5 percent. As used herein, the total purge gas flow-through area of the ferrule refers to the sum of the cross-sectional areas of all the unblocked purge gas openings 55, 57 and 59 at a given transverse position of ferrule 37 plus the cross-sectional areas of all unblocked portions of partially unblocked purge gas openings 55, 57 and 59.

In operation, air flows through fan assembly 23 and compressed air is supplied to high pressure compressor 25. The highly compressed air is delivered to combustor 27. Airflow from combustor 27 drives turbines 29 and 31, and turbine 31 drives fan assembly 23.

Air blows through unblocked purge gas openings 55, 57, 59 and carries fuel trapped in annular cavity 53 downstream to be burned in combustion chamber 47. When the ferrule 37 (and the combustion component 35 as well) is in the first (center) position shown illustrated in FIGS. 2a and 4a, the annular cavity 53 is sufficiently purged of trapped fuel by the first and second purge gas openings 55 and 57. As tolerance stackup and thermal growth cause ferrule 37 to become transversely offset from the first (center) position, e.g., at a second position relative to ferrule mount 39 as depicted in FIGS. 4c, 4d and 4e the third set of purge gas openings 59 is needed to allow sufficient air to flow through annular cavity 53 to keep it purged of trapped fuel.

By maintaining the total flow-through area of the ferrule relatively constant (e.g., within about 15 percent, more suitably within about 10 percent and even more suitably within about 5 percent), i.e., by blocking some purge gas openings 55, 57, 59 while unblocking others upon transverse movement of ferrule 37, a ratio of air flow rate to total flow-through area of ferrule 37 enables a desired air velocity into combustion chamber 47, and a desired fuel-to-air ratio in combustion chamber 47 to be substantially maintained throughout the full range of transverse movement of ferrule 37 relative to ferrule mount 39. It is contemplated that doing so may provide a drop in gas temperature in the vicinity of the fuel conduit 35 (broadly, combustor component 35).

It is understood, then, that while ferrule 37 as illustrated and described herein includes three sets or rings of purge gas openings 55, 57, 59, ferrule 37 may have two sets of purge gas openings, or more than three sets of purge gas openings, without departing from the scope of this invention. It is also contemplated that purge gas openings 55, 57, 59 need not be arranged in ring-like patterns. For example, purge gas openings 55, 57, 59 may have transversely staggered positions and remain within the scope of this invention.

While the ferrule shown and described herein is used in connection with mounting the fuel conduit on the combustor housing, it is understood that the ferrule may be used to mount other combustor components on the housing for extension into the combustion chamber. For example, one or more igniters, the construction and operation of which is known to those skilled in the art, for igniting fuel into a combustion chamber may be mounted onto a housing by a ferrule similar to that shown and described herein. Another example is an afterburner, the construction and operation of which is known to those skilled in the art, and which may be mounted onto a housing by a ferrule similar to that shown and described herein.

When introducing elements of the present invention or preferred embodiments thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A ferrule assembly for mounting a combustor component on a combustor housing of a gas turbine engine, the combustor housing at least in part defining an internal combustion chamber of the combustor, the ferrule assembly comprising:

a ferrule mount secured to the housing to remain generally stationery relative thereto during operation of the gas turbine engine; and a ferrule mounted on the ferrule mount for transverse sliding movement relative thereto between a first transverse ferrule position and a second transverse ferrule position, the ferrule having a primary opening for receiving the combustor component therethrough for conjoint transverse movement with the ferrule relative to the ferrule mount, said ferrule further having a plurality of purge gas openings formed therein separate from and uniformly spaced transversely from the primary opening a first distance, a plurality of second purge gas openings uniformly spaced transversely from the primary opening a second distance greater than said first distance, and a plurality of third purge gas openings uniformly spaced transversely from the primary opening a third distance greater than said second distance, in the first ferrule position at least one of the second purge gas openings and at least one of the third purge gas openings being blocked by the ferrule mount against the flow of purge gas therethrough, at least one of said blocked second purge gas openings and at least one of said blocked third purge gas openings being unblocked by the ferrule mount in the second ferrule position to permit the flow of purge gas therethrough into the combustion chamber.

2. The ferrule assembly set forth in claim 1, wherein the ferrule is moveable through a maximum range of transverse movement relative to said ferrule mount, the ferrule mount being configured to limit transverse movement of the ferrule relative thereto to said maximum range of transverse movement.

3. The ferrule assembly set forth in claim 2, wherein at least one of said first, second, or third purge gas openings remains unblocked at every position of the ferrule throughout said maximum range of transverse movement of said ferrule relative to said ferrule mount.

4. The ferrule assembly set forth in claim 1, wherein in the second position of the ferrule relative to the ferrule mount at least one of the unblocked purge gas openings of the first ferrule position is blocked by said ferrule mount against the flow of purge gas into the combustion chamber.

5. The ferrule assembly set forth in claim 1, wherein all of the third purge gas openings are blocked against the flow of purge gas therethrough in the first position of the ferrule.

* * * * *